US010326519B2

United States Patent
Khan et al.

(10) Patent No.: US 10,326,519 B2
(45) Date of Patent: Jun. 18, 2019

(54) COMMUNICATIONS SYSTEM BRIDGING WIRELESS FROM OUTDOOR TO INDOOR

(71) Applicant: Phazr, Inc., Allen, TX (US)

(72) Inventors: Farooq Khan, Allen, TX (US); Eran Pisek, Allen, TX (US); Robert Clark Daniels, Austin, TX (US); Khurram Muhammad, Fort Worth, TX (US); Khalil Haddad, Allen, TX (US); Paul Gilliland, Allen, TX (US)

(73) Assignee: Phazr, Inc., Allen, TX (US)

( * ) Notice: Subject to any disclaimer, the term of this patent is extended or adjusted under 35 U.S.C. 154(b) by 0 days.

(21) Appl. No.: 15/627,146

(22) Filed: Jun. 19, 2017

(65) Prior Publication Data

US 2018/0019798 A1 Jan. 18, 2018

Related U.S. Application Data

(60) Provisional application No. 62/363,222, filed on Jul. 16, 2016.

(51) Int. Cl.
| | |
|---|---|
| *H04B 7/155* | (2006.01) |
| *H04B 5/00* | (2006.01) |
| *H04W 72/04* | (2009.01) |
| *H02J 50/10* | (2016.01) |
| *H02J 50/20* | (2016.01) |

(52) U.S. Cl.
CPC .......... *H04B 7/15507* (2013.01); *H02J 50/10* (2016.02); *H04B 5/0037* (2013.01); *H04W 72/0453* (2013.01); *H02J 50/20* (2016.02)

(58) Field of Classification Search
CPC ............. H04B 5/0037; H04B 7/15507; H04W 72/0453; H02J 50/10
See application file for complete search history.

(56) References Cited

U.S. PATENT DOCUMENTS

| | | | | |
|---|---|---|---|---|
| 6,032,020 | A * | 2/2000 | Cook ................... | H04B 7/2606 455/16 |
| 9,974,965 | B2 * | 5/2018 | Perryman .......... | A61N 1/37223 |
| 2004/0261432 | A1 * | 12/2004 | Yamamoto ............... | F24F 11/30 62/132 |
| 2006/0223561 | A1 * | 10/2006 | Capece ................ | H04B 7/2606 455/509 |
| 2006/0267811 | A1 * | 11/2006 | Tan ..................... | G01R 13/0272 341/51 |
| 2009/0111531 | A1 * | 4/2009 | Cui .......................... | H01Q 1/243 455/572 |
| 2009/0294668 | A1 * | 12/2009 | Bowers .................. | G02B 27/40 250/336.1 |
| 2010/0008287 | A1 * | 1/2010 | Lin ........................ | H04B 7/022 370/315 |
| 2011/0050515 | A1 * | 3/2011 | Liu ........................ | H01Q 21/24 343/703 |

(Continued)

*Primary Examiner* — Dominic E Rego
(74) *Attorney, Agent, or Firm* — Michael A. Rahman

(57) ABSTRACT

A wireless communications system includes an outside module configured to communicate with a radio base station. The outside module includes a wireless power receiver. The system includes an inside module configured to communicate with the outside module and to communicate with a communications device. The inside module includes a wireless power transmitter configured to wirelessly transmit power to the outside module.

19 Claims, 19 Drawing Sheets

(56) References Cited

U.S. PATENT DOCUMENTS

| | | | |
|---|---|---|---|
| 2011/0053492 A1* | 3/2011 | Hochstein | H05B 37/0272 455/7 |
| 2011/0053632 A1* | 3/2011 | Liu | H04B 17/102 455/522 |
| 2011/0158156 A1* | 6/2011 | Ma | H04B 7/15542 370/315 |
| 2012/0116155 A1* | 5/2012 | Trusty | A61B 1/00013 600/109 |
| 2012/0129458 A1* | 5/2012 | Yim | B66B 1/34 455/66.1 |
| 2012/0322366 A1* | 12/2012 | Davies | H04B 7/15542 455/18 |
| 2013/0076577 A1* | 3/2013 | Chakam | H01Q 1/088 343/713 |
| 2013/0162471 A1* | 6/2013 | Suzuki | G01S 19/39 342/357.43 |
| 2013/0315109 A1* | 11/2013 | Raaf | H04B 7/15528 370/277 |
| 2013/0329646 A1* | 12/2013 | Fukumoto | H04W 40/12 370/328 |
| 2014/0159651 A1* | 6/2014 | Von Novak | H04B 5/0037 320/108 |
| 2014/0243043 A1* | 8/2014 | Shen | H04W 88/10 455/553.1 |
| 2015/0002080 A1* | 1/2015 | Lang | H02J 7/0068 320/107 |
| 2015/0078497 A1* | 3/2015 | Zhang | H04L 27/2647 375/347 |
| 2015/0206368 A1* | 7/2015 | Fischer | G07D 3/14 453/3 |
| 2015/0236663 A1* | 8/2015 | Buer | H03F 3/19 455/20 |
| 2015/0326378 A1* | 11/2015 | Zhang | H04W 76/14 370/280 |
| 2015/0350992 A1* | 12/2015 | Han | H04B 7/0417 370/331 |
| 2016/0047884 A1* | 2/2016 | Zhang | H04B 7/0617 342/458 |
| 2016/0176542 A1* | 6/2016 | Wilkins | A01M 27/00 348/144 |
| 2016/0248451 A1* | 8/2016 | Weissman | H04B 1/0064 |
| 2016/0262156 A1* | 9/2016 | Yilmaz | H04W 72/0453 |
| 2016/0294441 A1* | 10/2016 | Fazlollahi | H04B 3/36 |
| 2017/0040827 A1* | 2/2017 | Weber | H02J 50/80 |
| 2017/0062942 A1* | 3/2017 | Kim | H01Q 13/06 |
| 2017/0078140 A1* | 3/2017 | Gibson | H04L 41/0806 |
| 2017/0102450 A1* | 4/2017 | Eynon | G01S 7/003 |
| 2017/0250566 A1* | 8/2017 | Rudser | H02J 7/025 |
| 2017/0257157 A1* | 9/2017 | Han | H04B 7/15507 |
| 2017/0353337 A1* | 12/2017 | Chakraborty | H04B 1/30 |
| 2018/0026689 A1* | 1/2018 | Khan | H04B 7/06 |
| 2018/0159338 A1* | 6/2018 | Leabman | H04W 4/80 |

* cited by examiner

COMMUNICATIONS SYSTEM BRIDGING WIRELESS FROM OUTDOOR TO INDOOR

CROSS-REFERENCE TO RELATED APPLICATION

This application claims priority to U.S. Provisional Patent Application No. 62/363,222, filed Jul. 16, 2016, and entitled "COMMUNICATIONS DEVICE BRIDGING GIGABIT/S WIRELESS FROM OUTDOOR TO INDOOR" which is hereby incorporated by reference in its entirety.

BACKGROUND

The invention is related to wireless communications and in particular to a communications system for bridging wireless from outdoor to indoor.

DESCRIPTION OF THE RELATED ART

Currently, wireless access methods are based on two popular standards: a wide area network (WAN) standard referred to as The Fourth Generation Long Term Evolution (4G LTE) system; and a local area network (LAN) standard called Wi-Fi. Wi-Fi is generally used indoors as a short-range wireless extension of wired broadband systems. The 4G LTE systems on the other hand provide wide area long-range connectivity both outdoors and indoors using dedicated infrastructure such as cell towers and backhaul to connect to the Internet.

As more people connect to the Internet, increasingly chat with friends and family, watch videos, listen to streamed music, and indulge in virtual or augmented reality, data traffic continues to grow at unprecedented rates. In order to address the continuously growing wireless capacity challenge, the next generation of LAN and WAN systems are expected to rely on higher frequencies referred to as millimeter waves in addition to currently used frequency bands below 6 GHz.

At millimeter wave frequencies, radio spectrum use is lighter, and very wide bandwidths along with a large number of smaller antennas can be used to provide the orders of magnitude increase in capacity needed in the next 15 to 20 years. The smaller size of antennas is enabled by carrier waves that are millimeters long compared to centimeter-long waves at currently used lower frequencies. A drawback of millimeter waves frequencies, however, is that they tend to lose more energy than do lower frequencies over long distances because they are readily absorbed or scattered by gases, rain, and foliage. Millimeter waves also experience higher losses when penetrating through structures such as walls or any other building materials.

SUMMARY OF THE INVENTION

According to disclosed embodiments, a wireless communications system includes an outside module configured to communicate with a radio base station. The outside module includes a wireless power receiver. The system includes an inside module configured to communicate with the outside module and to communicate with a communications device. The inside module includes a wireless power transmitter configured to wirelessly transmit power to the outside module.

According to other disclosed embodiments, the inside module is configured to operate as a wireless extender by transferring signals between the outside module and a communication device.

According to other disclosed embodiments, a wireless communications system includes an outside module configured to communicate with a radio base station at a first frequency in the uplink direction and at a second frequency in the downlink direction. The outside module includes a wireless power receiver. The system includes an inside module configured to communicate with the outside module at a third frequency and to communicate with a communications device at a fourth frequency. The inside module includes a wireless power transmitter configured to wirelessly transmit power to the outside module. The second frequency is in the millimeter wave frequency band and the first, third and fourth frequencies are in the sub-6 GHz bands.

DETAILED DESCRIPTION AND BEST MODE OF IMPLEMENTATION

Figure 1:
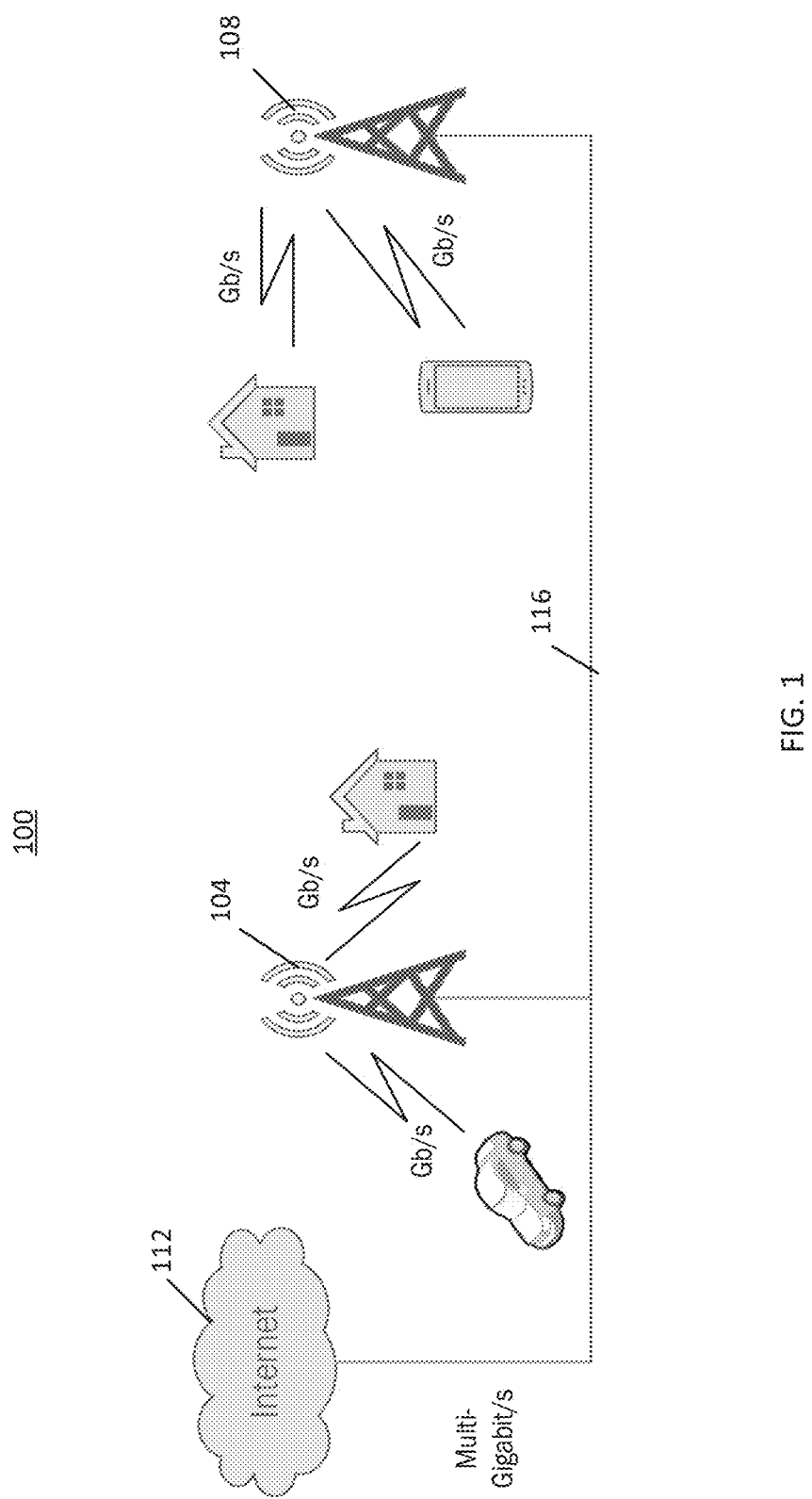
FIG. 1 illustrates a wireless communications system in accordance with disclosed embodiments.

FIG. 1 illustrates a wireless communications system 100 in accordance with disclosed embodiments. The system 100 enables Gigabits per second access to fixed and mobile users both outdoors and indoors using a single network as illustrated in FIG. 1.

Referring to FIG. 1, the system 100 includes radio base stations 104 and 108 capable of supporting an aggregate data capacity of hundreds of Gigabits per second serving a plurality fixed and mobile users at data speeds in excess of Gigabits/s. The radio base stations 104 and 108 are connected to the Internet 112 via a wired link 116 (e.g. fiber optical link) designed to handle aggregate data from multiple radio base stations.

Figure 2:
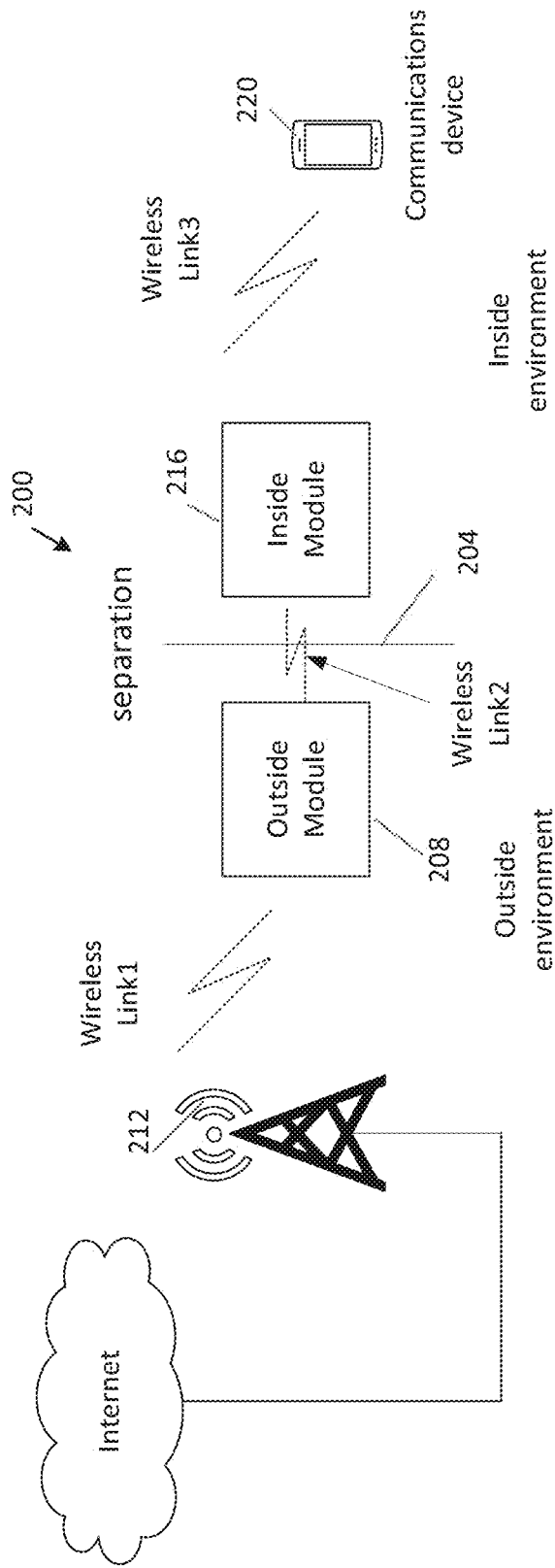
FIG. 2 illustrates outside to inside penetration of radio signals by an intermediate node in accordance with disclosed embodiments.

FIG. 2 illustrates an intermediate node 200 according to disclosed embodiments. The intermediate node 200 allows outside to inside penetration of radio signals. In one aspect, the intermediate node 200 refers to the communications link between an outside module 208 and an inside module 216. The functionality of the intermediate node 200 is split across a wall 204 separating the outside and inside environments. The wall 204 may be structure of a building that separates the inside environment from the outside environment. Alternatively, the wall 204 may be a structure that separates the inside compartment of a vehicle from the outside environment. The outside module 208 communicates with a radio base station 212 while the inside module 216 communicates with a communication device 220 inside. The inside and outside modules 216 and 208 communicate with each other using either wired or another wireless link. Thus, the communication device 220 inside a building or a vehicle can access the Internet without requiring a wired Internet connection such as DSL, Cable or FTTH.

Figure 3:
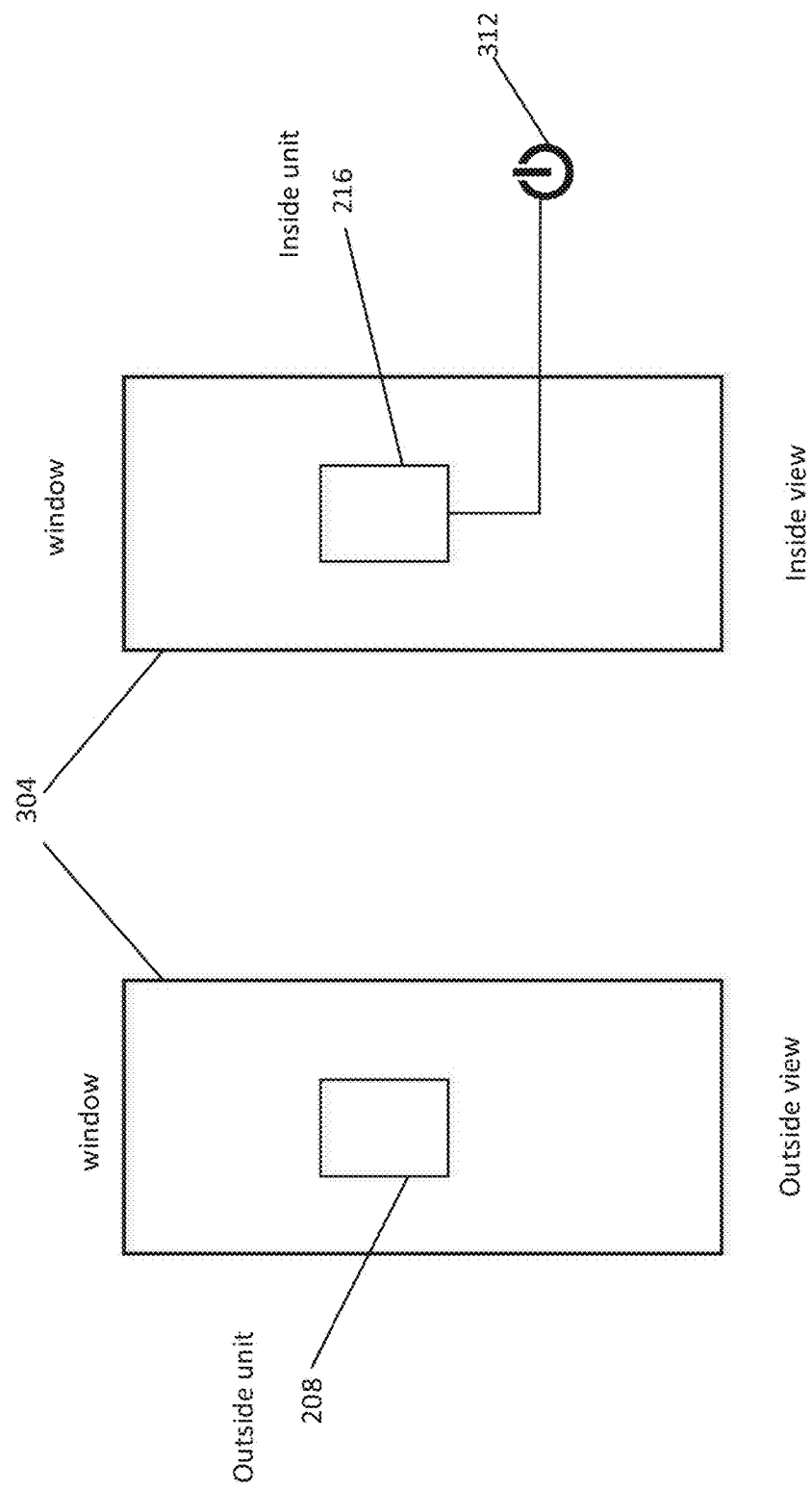
FIG. 3 illustrates an intermediate node installed in a window.

According to disclosed embodiments, the intermediate node 200 is installed in a glass window 304 of a home or building as illustrated in FIG. 3. The outside module 208 is attached to the outer side of the glass window 304 while the inside module 216 is attached to the inner side of the glass window 304. The inside module 216 is connected to a power source 312 inside the home or building. The outside module 208 is powered by the inside module 216 using a wireless power transfer mechanism based on resonant or non-resonant inductive coupling methods. The data link between the two modules uses wireless communication. Thus, there is no need to drill holes or run any wires for power or communication with the outside module.

Figure 4:
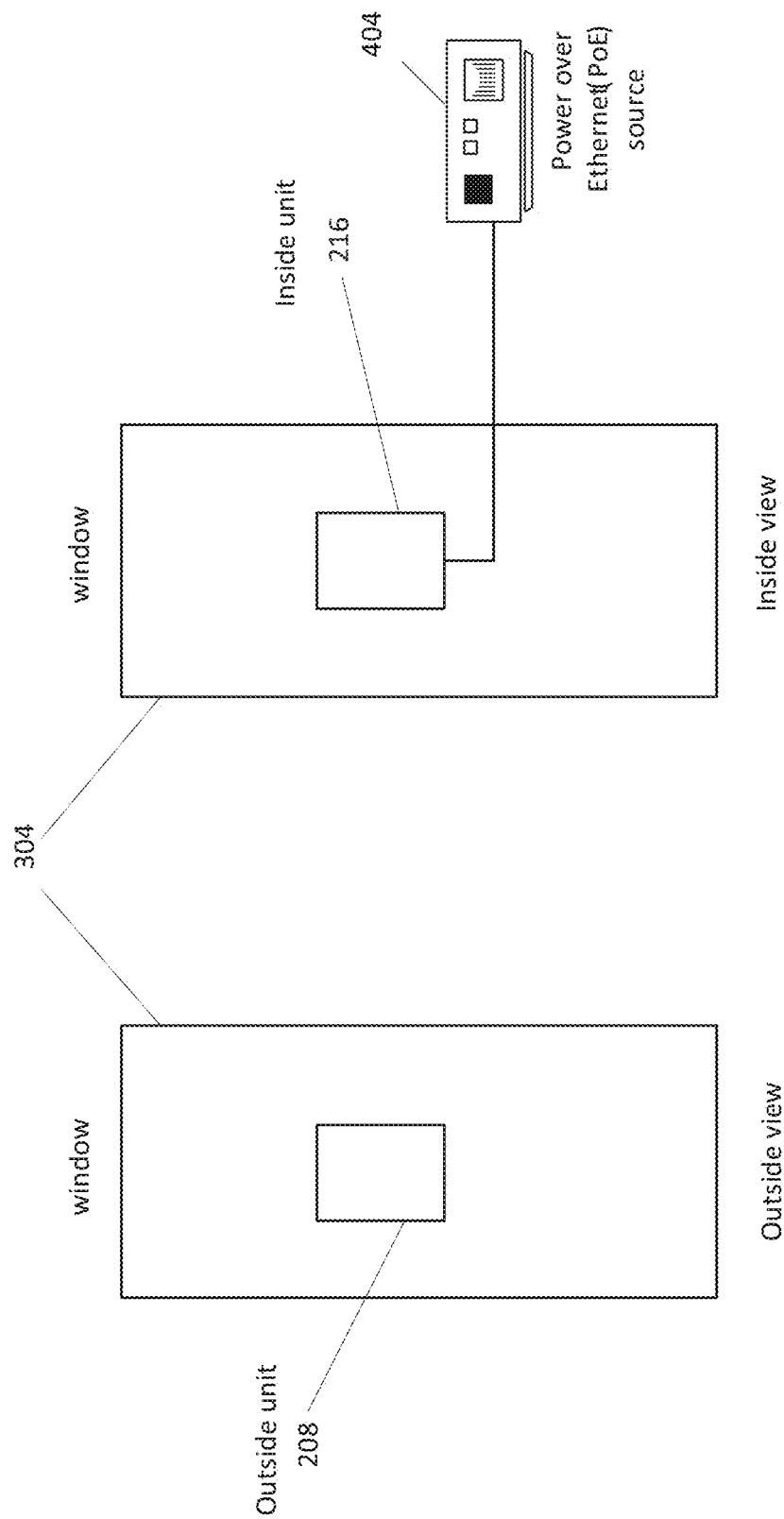
FIGS. 4-17 illustrate other disclosed embodiments.

FIG. 4 illustrates the intermediate node installed in the window of a home or building where the inside unit 216 is powered by an inside power-over-Ethernet (PoE) source 404 and outdoor unit 208 powered by the inside unit wirelessly. This configuration allows a wireless router (not shown in FIG. 4) to be connected to the inside unit 216 via an Ethernet cable that carries both power and data.

According to other embodiments of the invention, the intermediate node may be installed on the side or roof of a vehicle. The outside module 208 may be attached to the outer side of a glass window or a windshield while the inside module 216 may be attached to the inner side. The inside module 216 is connected to a power source inside the vehicle. The outside module 208 is powered by the inside module using a wireless power transfer mechanism based on resonant or non-resonant inductive coupling methods. The data link between the two modules uses wireless communication. Thus, there is no need to drill holes or run any wires for power or communication with the outside module.

Figure 5:
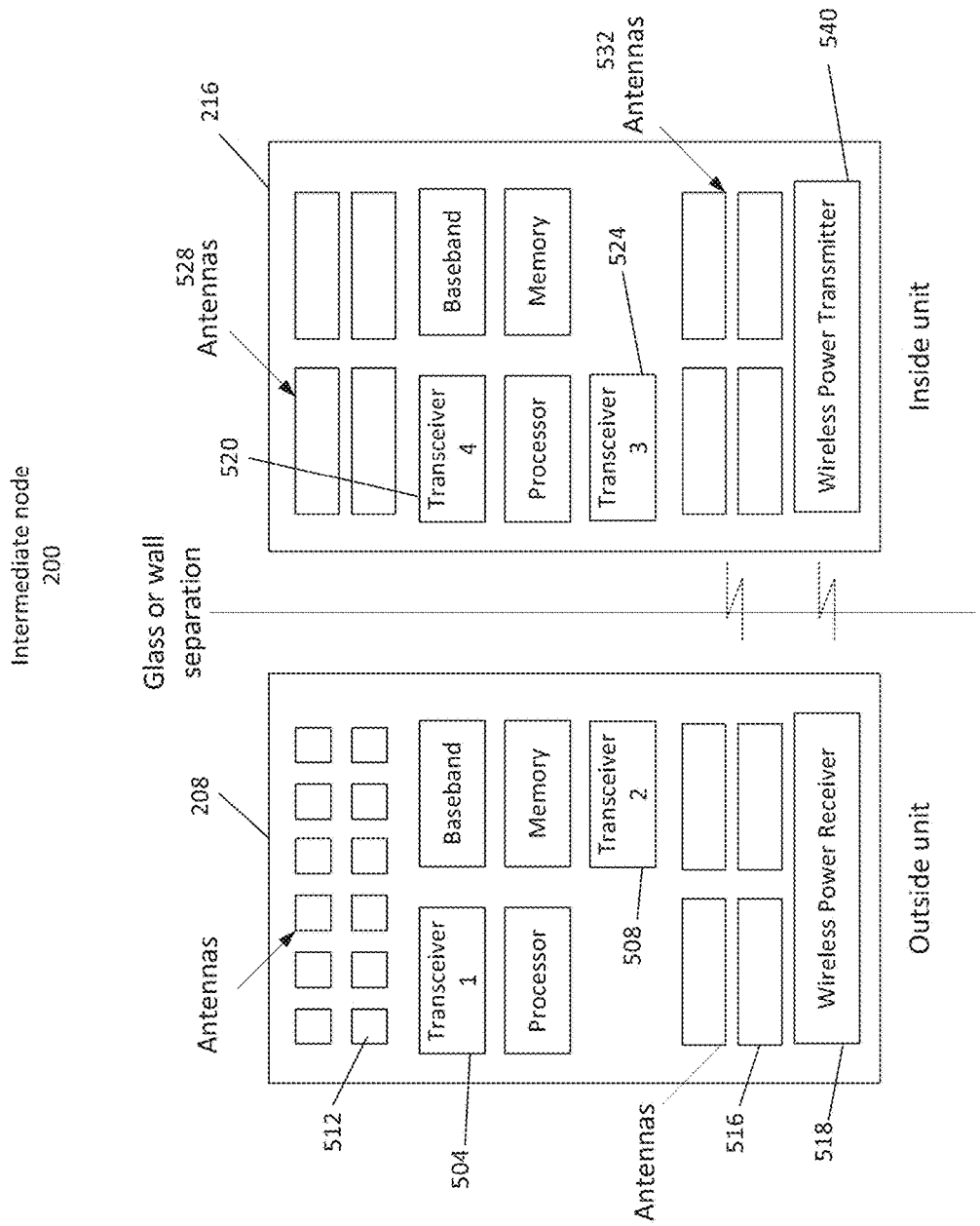

FIG. 5 illustrates communications and wireless power transfer functions implemented in the intermediate node 200. The outside module 208 implements communication transceivers 504 and 508, antennas 512 and 516, and a wireless power receiver 518. The outside module 208 communicates with the radio base station 104 using the communication transceiver 504 and antenna 512, and communicates with the inside module 216 using the communication transceiver 508 and antenna 516.

The inside module 216 implements communication transceivers 520 and 524 and antennas 528 and 532. The inside module 216 communicates with the outside module 208 using the communication transceiver 520 and the antenna 528, and communicates with communication devices inside the home, building or a car using the communication transceiver 524 and the antenna 532. The inside module is connected to the power source inside the home, car or building and includes a wireless power transmitter 540. The other functions implemented by the modules are baseband processing, communications protocol processing and wireless power transfer protocol processing.

Figure 6:
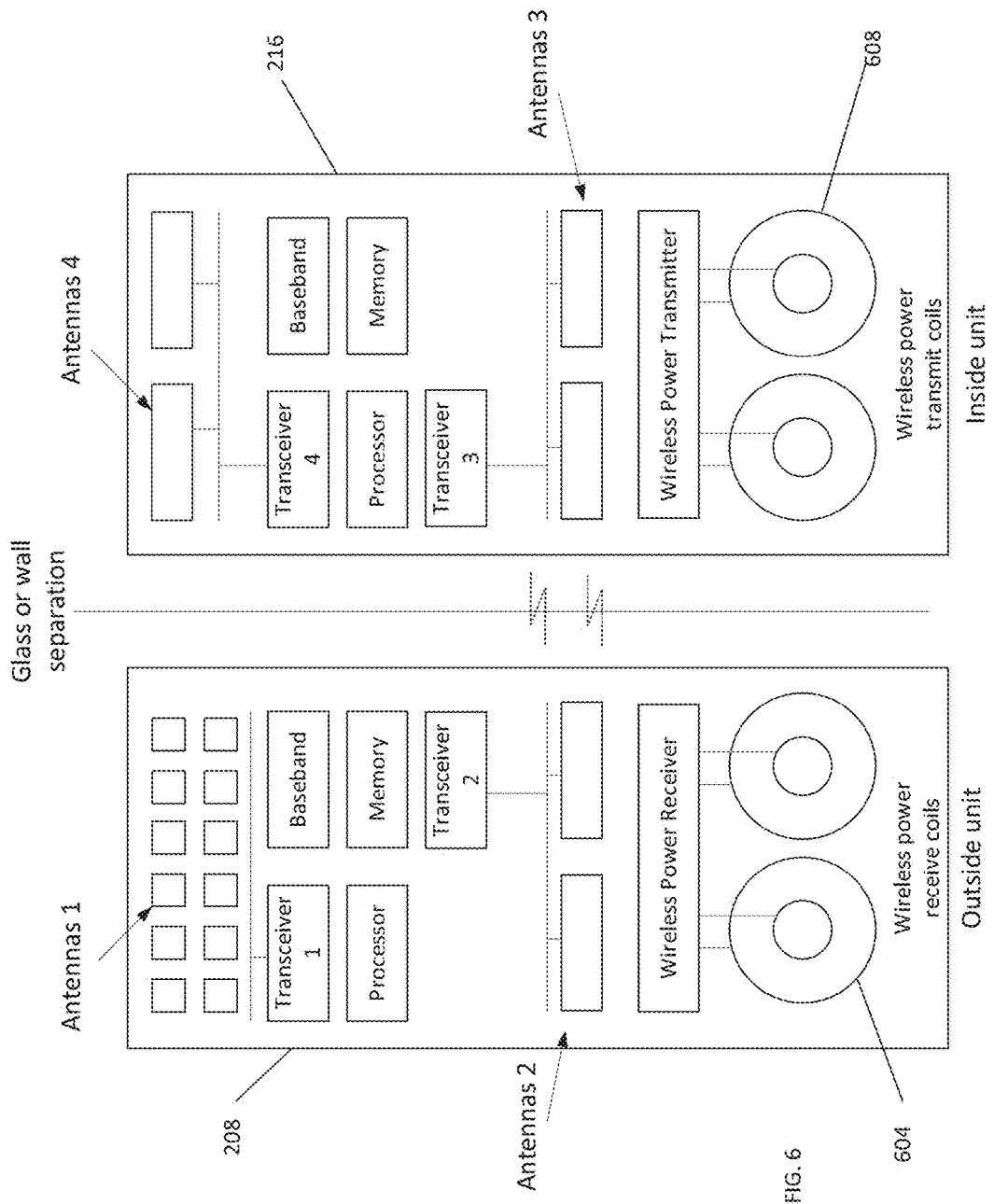

FIG. 6 illustrates another embodiment in which transmit and receive coils 604 and 608 for wireless power are aligned on the inside and outside modules 216 and 208 to maximize the power transfer efficiency. In the embodiment shown in FIG. 6, the same number and same size of the transmit and receive coils 604 and 608 are used. In alternate embodiments, the number and sizes of the transmit and receive coils can be different.

Figure 7:
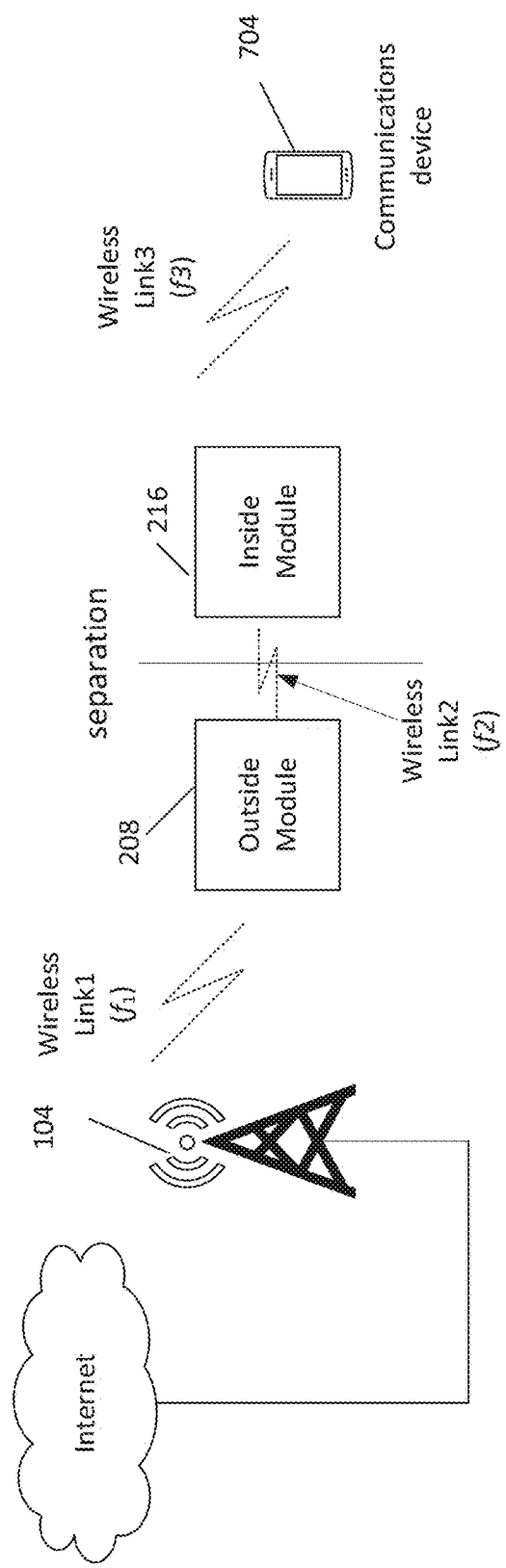

According to other disclosed embodiments, the outside module 208 communicates at a first frequency $f_1$ with the radio base station 104 and at a second frequency $f_2$ with the inside module 216 as shown in FIG. 7. The inside module further communicates at a third frequency $f_3$ with a communication device 704 inside the home, building or a car. In other embodiments, all the three frequencies can be the same or any two of the three frequencies can be the same.

Figure 8:
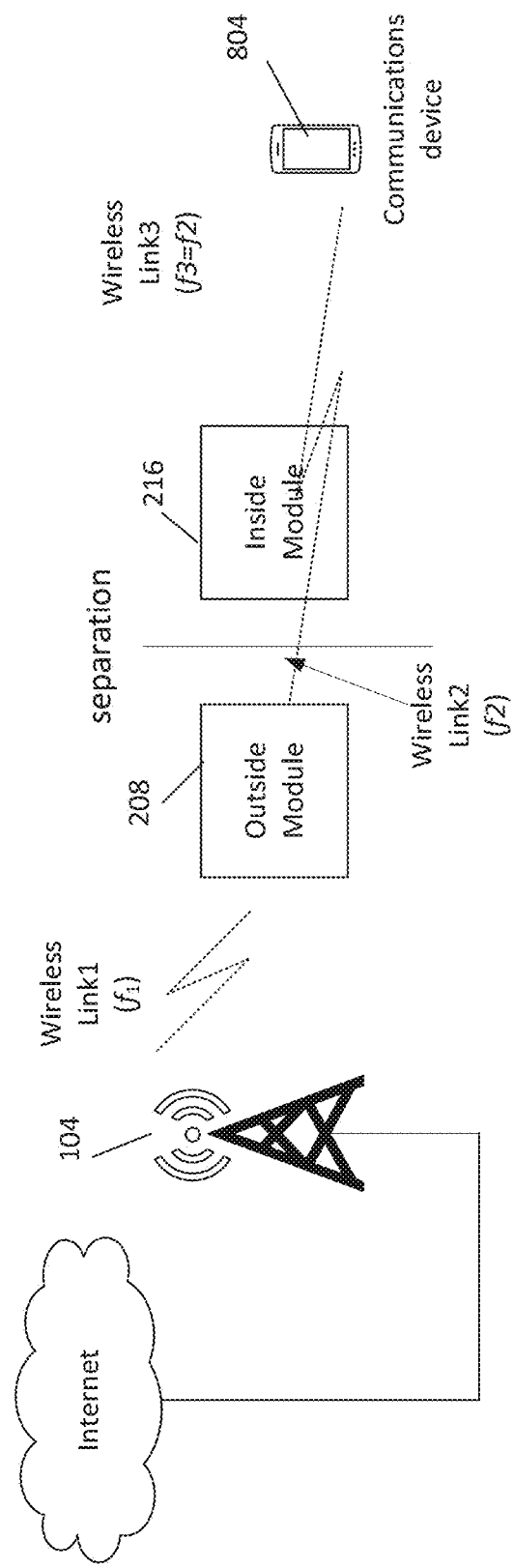

According to other disclosed embodiments, the outside module 208 communicates at a first frequency $f_1$ with the radio base station 104 and at a second frequency $f_2$ with the inside module 216 and a communication device 804 inside as illustrated in FIG. 8.

Figure 9:
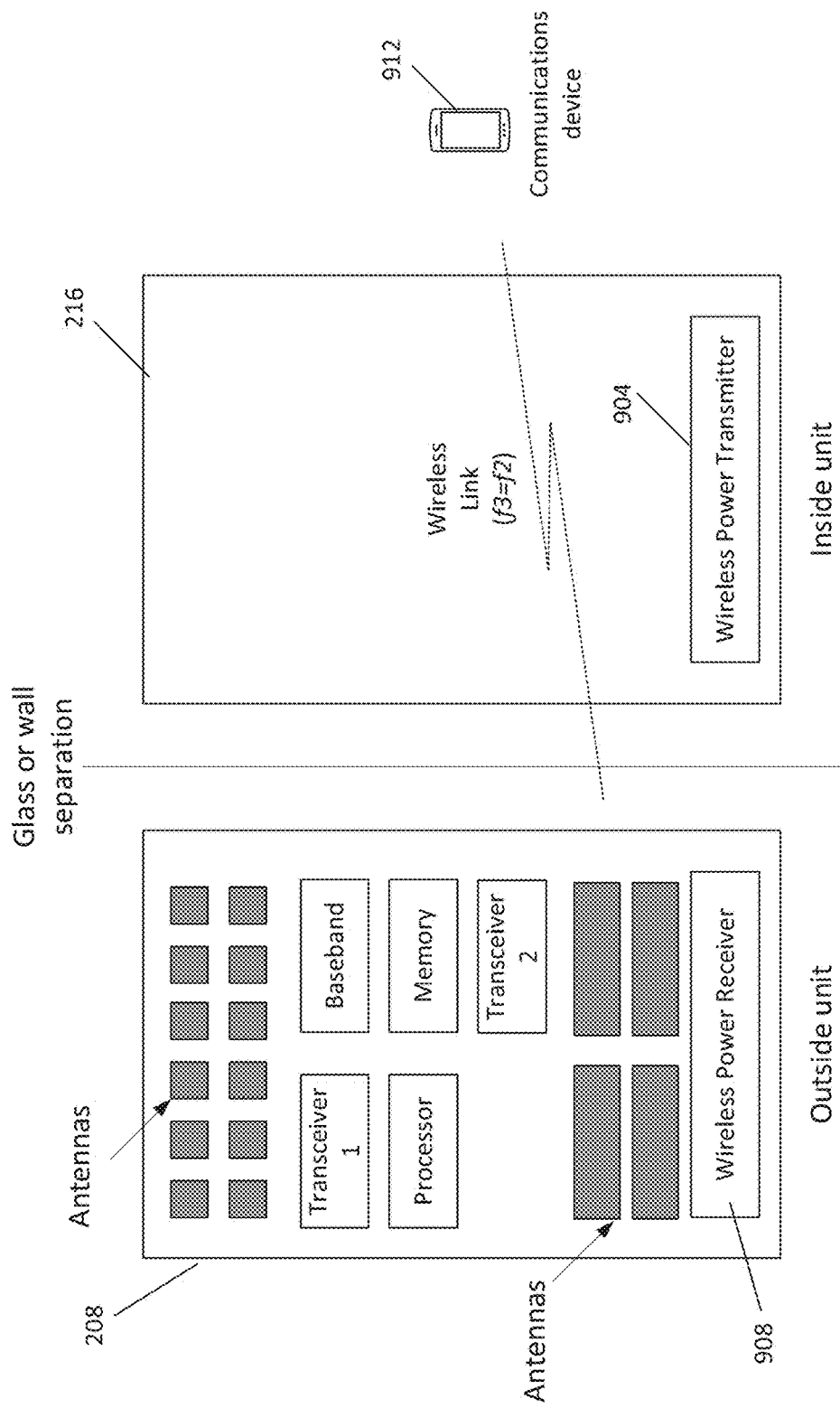

According to other disclosed embodiments illustrated in FIG. 9, the inside module 216 includes a wireless power transmitter 904 which transmits power to a wireless power transmitter 908 in the outside module 208. Thus, the inside module 216 is used as a wireless power transmitter to the outside module 208. In the embodiment illustrated in FIG. 9, the third frequency $f_3$ is equal to $f_2$ servicing the same protocol with the communication device 912 inside the home, building or a car.

Figure 10:
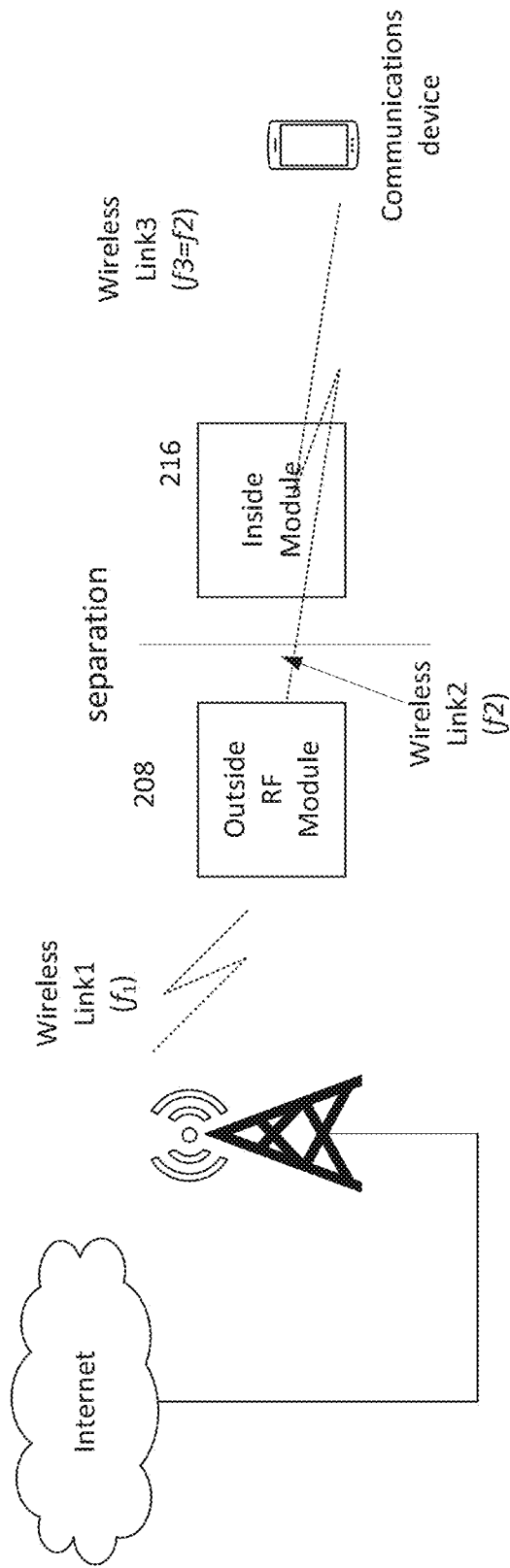

In another embodiment shown in FIG. 10, the outside module 208 communicates at a first frequency $f_1$ with the radio base station 104 and at a second frequency $f_2$ with the inside devices. The outside module 208 performs direct radio frequency (RF) conversion between $f_1$ and $f_2$ without baseband processing. The inside module 216 is used as a wireless power transmitter to the outside module while the third frequency $f_3$ is equal to $f_2$ servicing the same protocol with the communication devices inside the home, building or a car.

Figure 11:
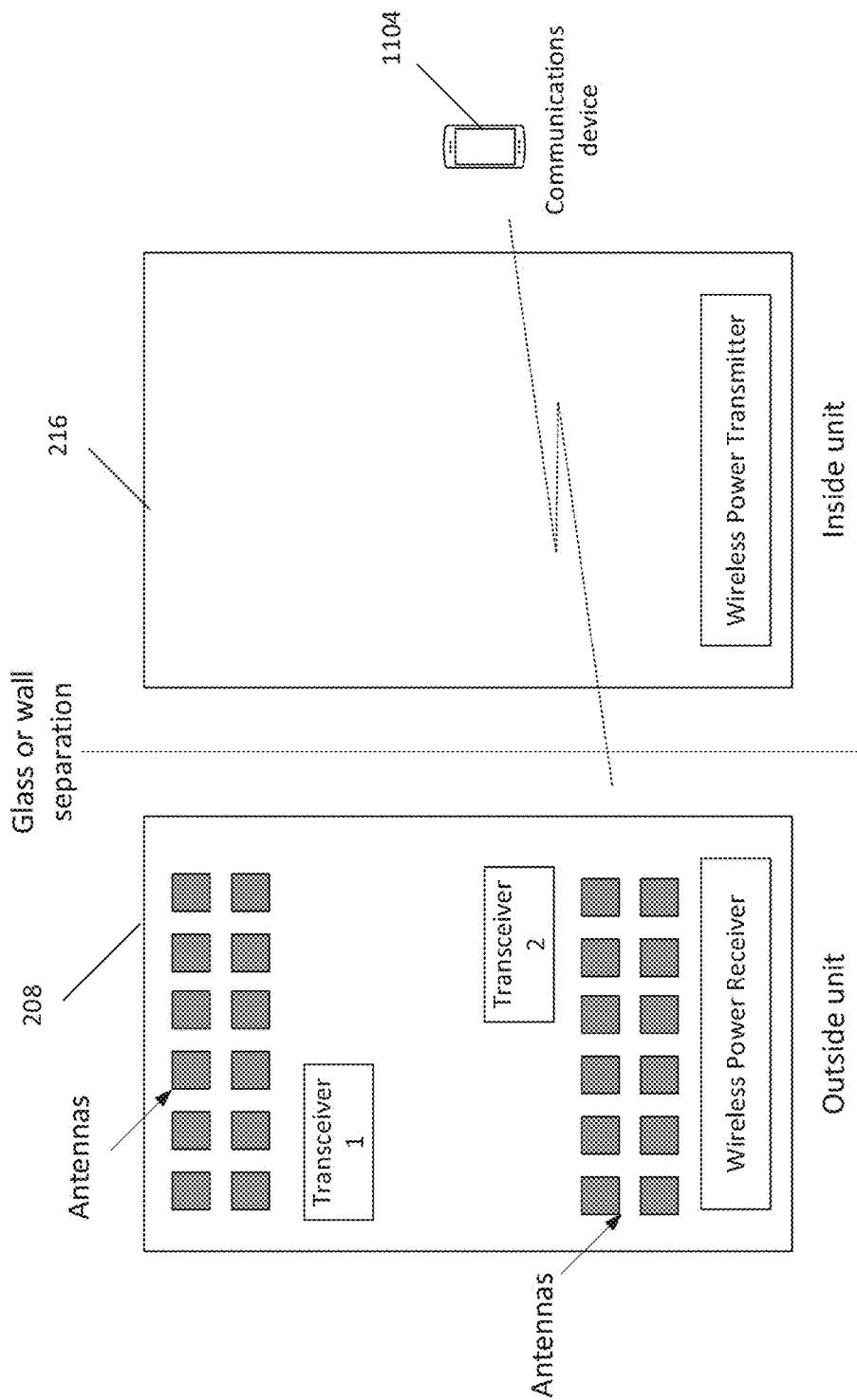

In another embodiment, the inside module 216 is used as a wireless power transmitter to the outside module while the third frequency $f_3$ is equal to $f_2$ and $f_1$ servicing the same protocol with the communication devices inside the home, building or a car as shown in FIG. 11. The outside module 208 is used as a repeater or extender for the communication between the base station 104 and the devices 216 and 1104.

Figure 12:
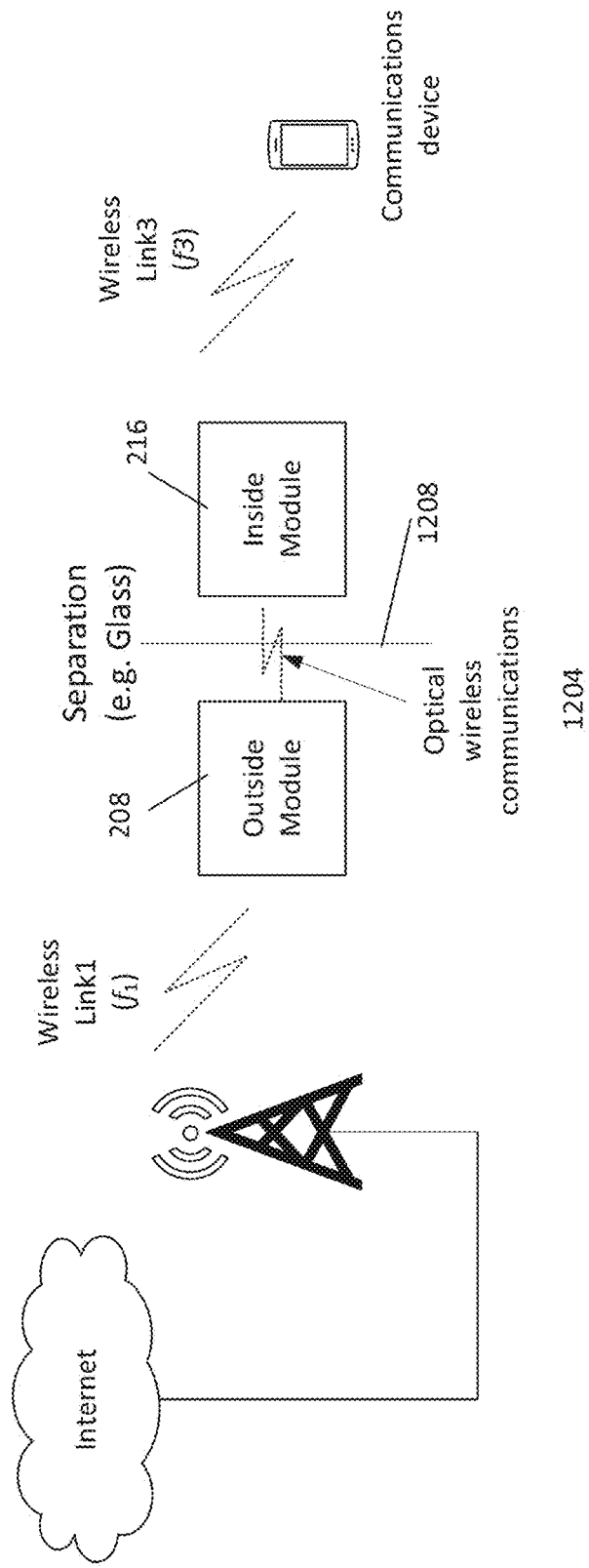

In another embodiment illustrated in FIG. 12, the outside and the inside modules 208 and 216 communicate with each other using optical wireless communications 1204. In this embodiment, the two modules 208 and 216 are separated by a medium such as glass 1208 that is transparent to optical waves.

Figure 13:
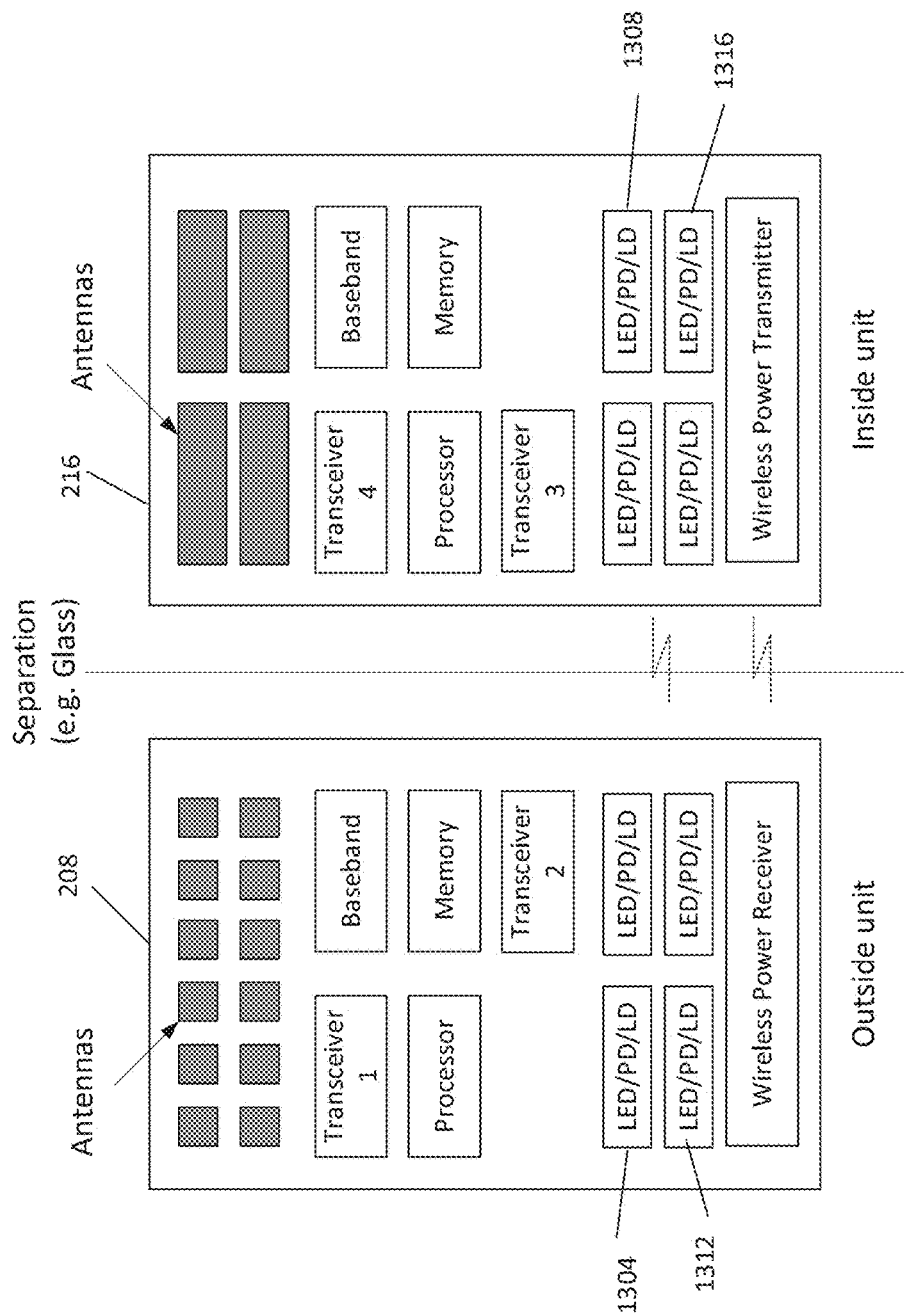

FIG. 13 illustrates another embodiment of the invention wherein the outside module 208 and the inside module 216 communicate using optical wireless communications. In the example of FIG. 13, the outside module 208 and the inside module 216 include light emitting diodes (LED) 1304 and 1308 as transmitters and photodiodes 1312 and 1316 (PD) as receivers. In another embodiment, laser diodes (LD) may be used instead of light emitting diodes.

In another embodiment of the invention, the outside and the inside modules 208 and 216 communicate with each other using both wireless and/or optical wireless communications using infrared (IR) wavelengths.

Figure 14:
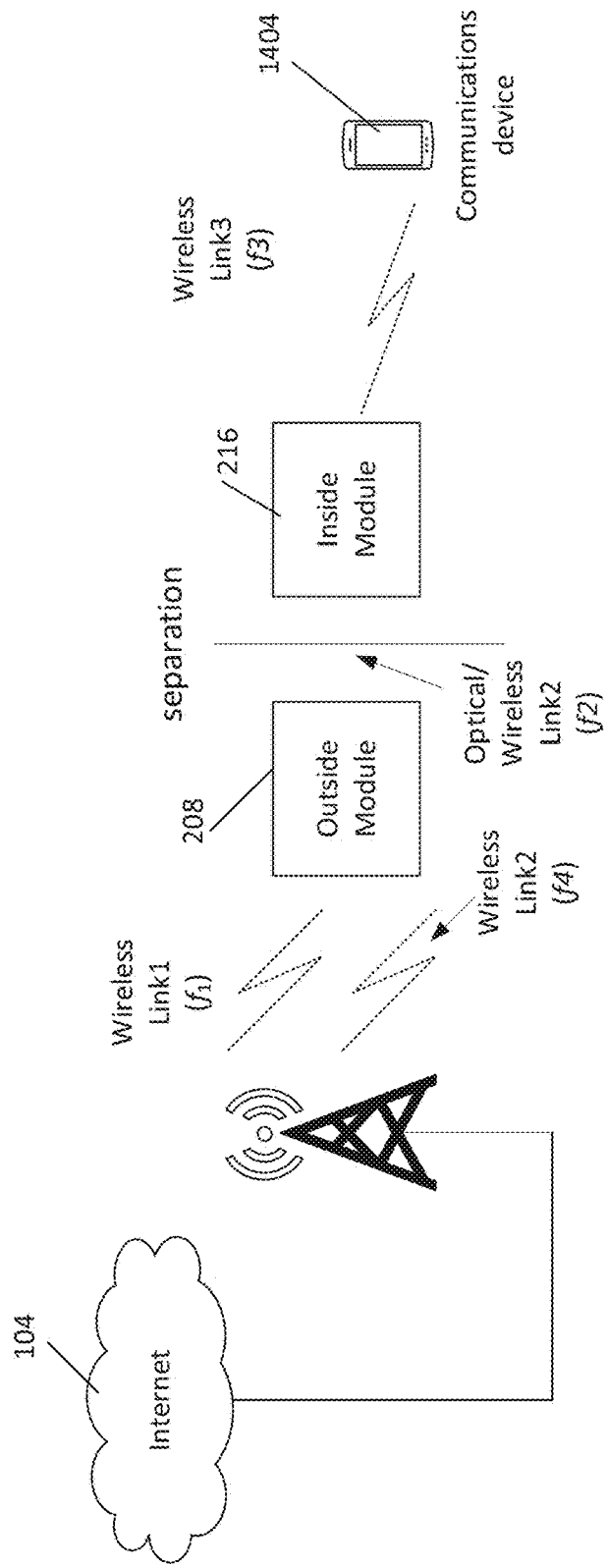
Figure 15:
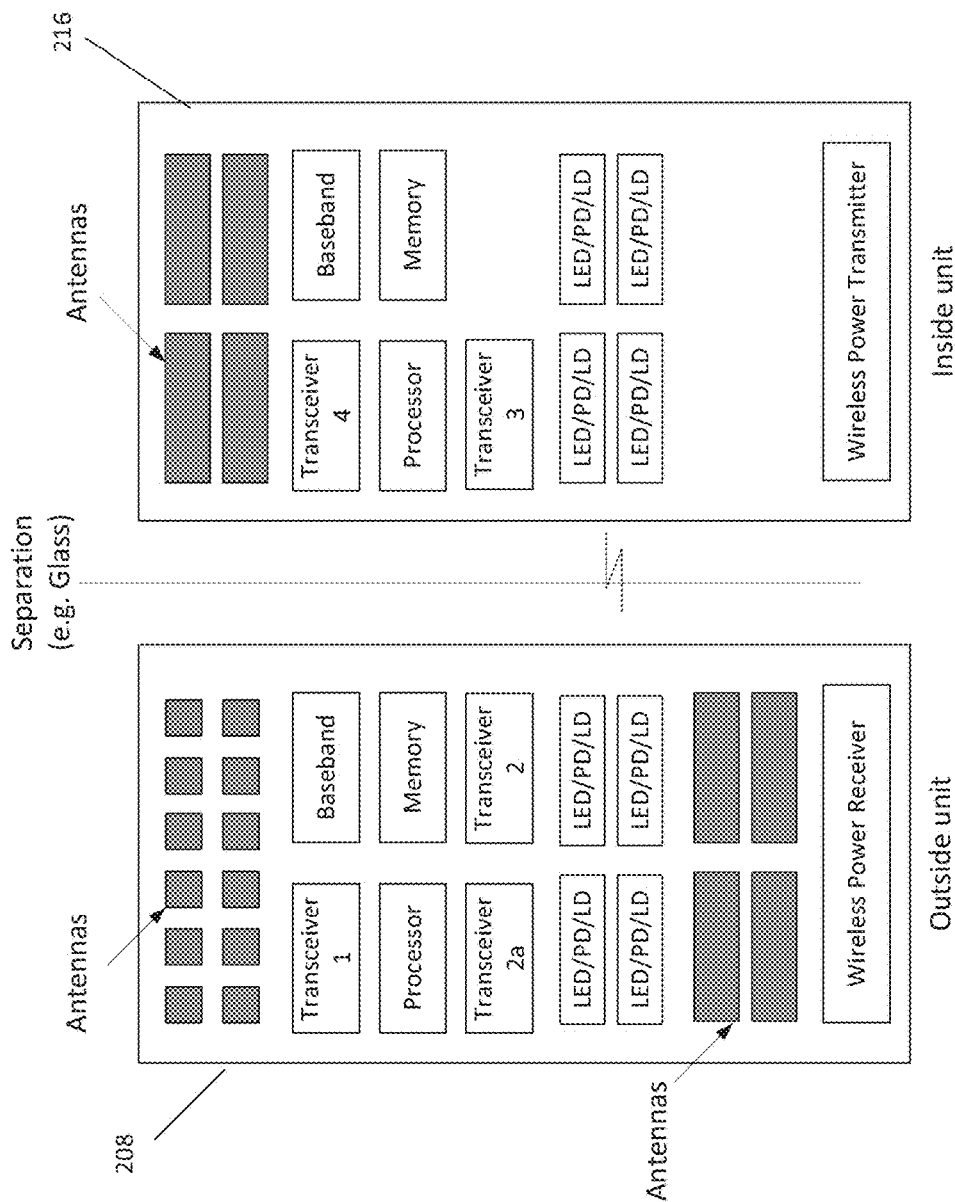

FIGS. 14 and 15 illustrate another embodiment of the invention wherein the outside module 208 communicates at both first frequency $f_1$ and fourth frequency $f_4$ with the radio base station 104 while communicating between the outside and inside modules 208 and 216 with the second frequency $f_2$ or optical (visible light or IR), and at a third frequency $f_3$ with the inside communication devices 1404. As shown in FIG. 15, the inside module 216 is used as a wireless power transmitter to the outside module 208 while the first frequency $f_1$ can be used as receiving only from the base station 104 and the fourth frequency $f_4$ can be used as transmitting only to the radio base station 104. The link with the base station 104 can involve receiving signal from the base station using $f_1$ and process the data through the outside module 208 only and send a signal back to the base station 104 using $f_4$ with or without involving the rest of the frequencies $f_2$ or $f_3$. Such a link may utilize a Request-To-Send (RTS) received from the base station 104 and a Clear-To-Send (CTS) protocols from the outside module 208 back to the base station.

Figure 16:
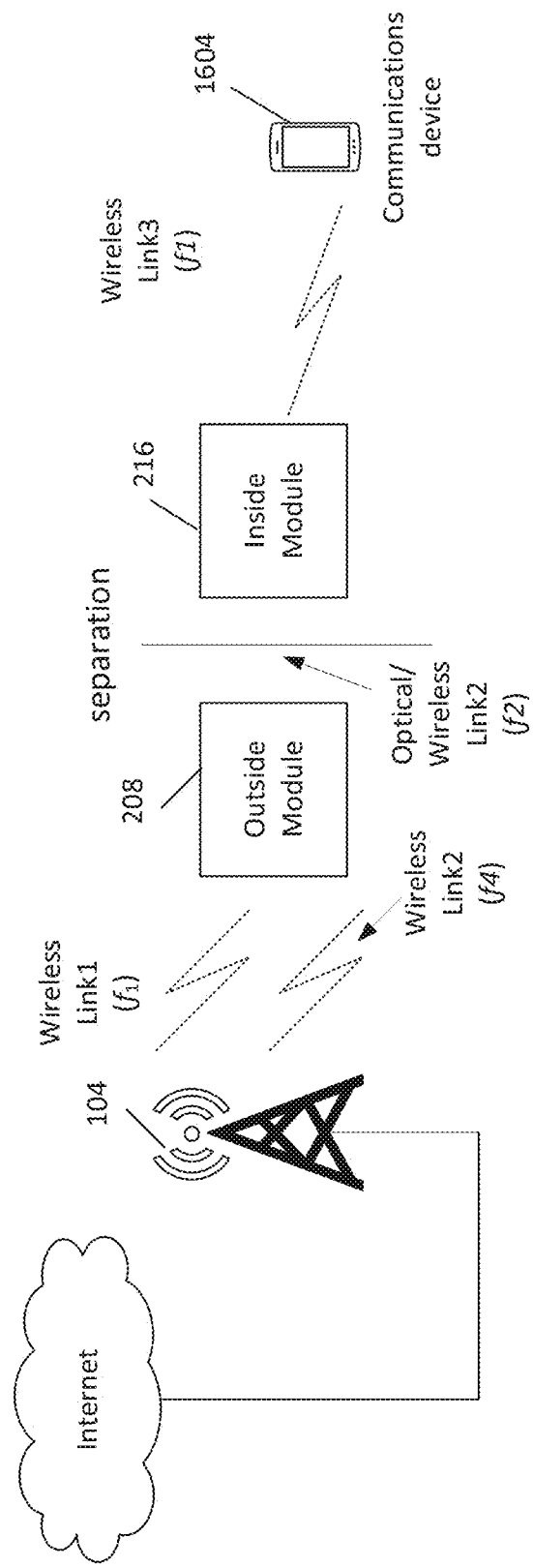
Figure 17:
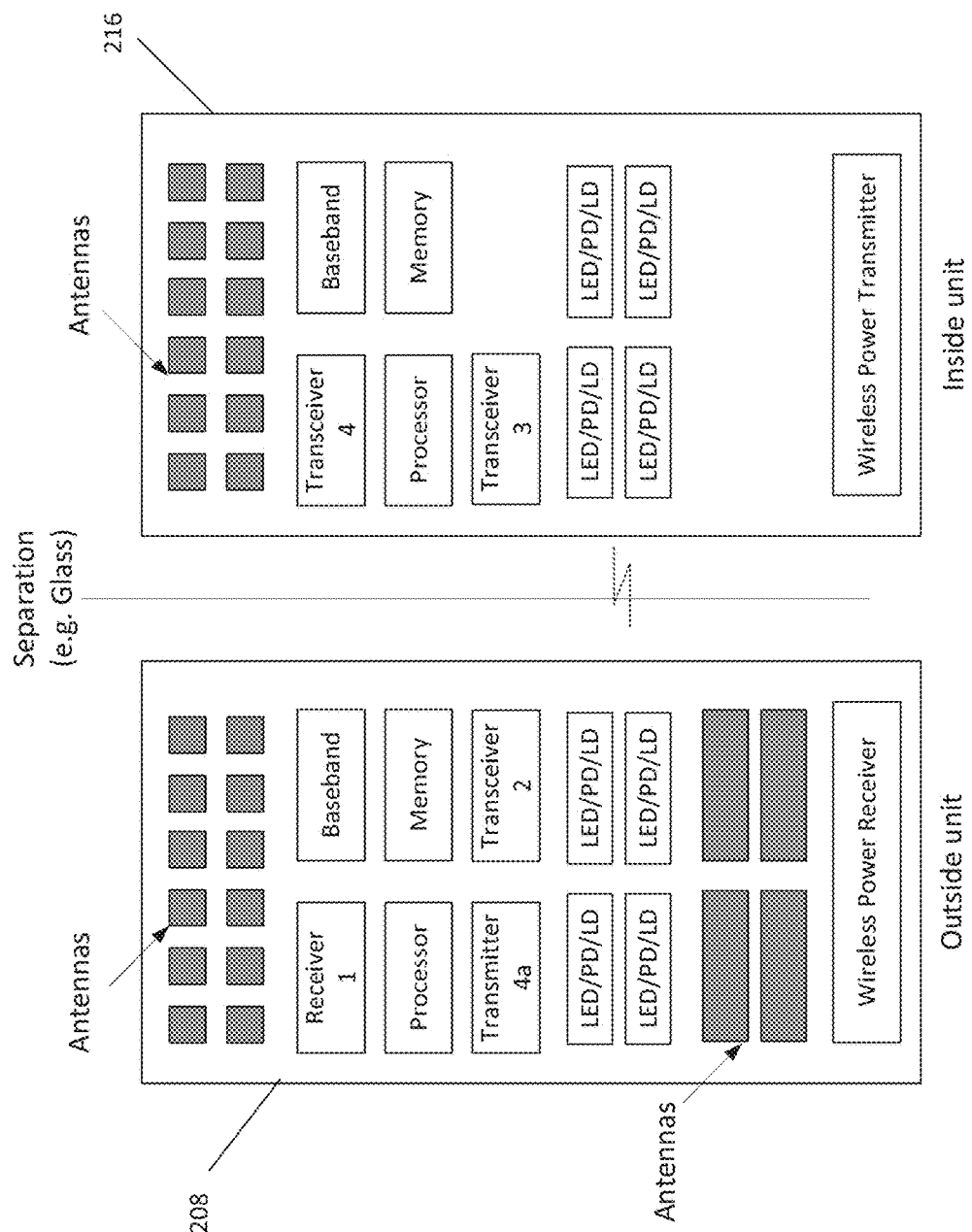

In another embodiment illustrated in FIGS. 16 and 17, the outside module 208 communicates at both first frequency $f_1$ and fourth frequency $f_4$ with the radio base station 104 while communicating between the outside and inside modules 208 and 216 with the second frequency $f_2$ or optical (visible light or IR), and at a first frequency $f_1$ with the inside communication devices 1604.

The inside module 216 is used as a wireless power transmitter to the outside module 208 while the first frequency $f_1$ can be used as receiving only from the base station 104 and the fourth frequency $f_4$ can be used as transmitting only to the radio base station 104. The link with the base station 104 can involve receiving signal from the base station 104 using $f_1$ and process the data through the outside module 208 only and send a signal back to the base station 104 using transmitter 4a and frequency $f_4$. The inside module 216 converts the signal back to $f_1$ in order to communicate with communication devices 1604 and vice versa.

Figure 18:
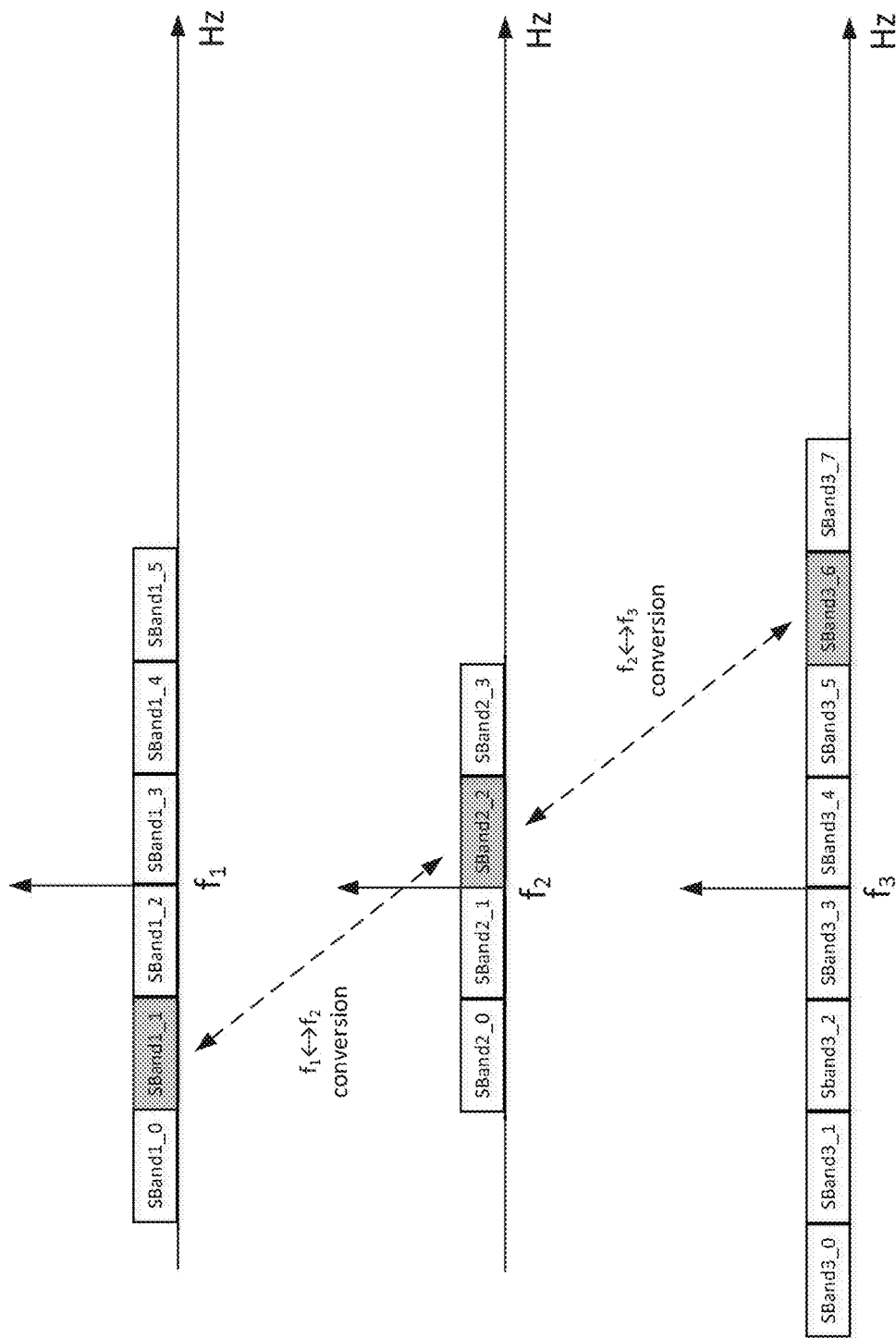
FIGS. 18 and 19 illustrate multi sub-band selections in accordance with disclosed embodiments.

According to disclosed embodiments, the outside and the inside modules 208 and 216 may include band selection mechanisms that select the frequency sub-bands within $f_1$, $f_2$, and $f_3$. Each of the $f_1$, $f_2$, and $f_3$ frequency bands may include multiple sub-bands within a total of a frequency bandwidth supported by the $f_1$, $f_2$, and $f_3$ frequency carriers. Referring to FIG. 18, there are six sub-bands in $f_1$ band, four sub-bands in $f_2$ band, and eight sub-bands in $f_3$ band. Each of the bands in the different frequencies can have different bandwidth. Thus, the sub-bands in the different frequency bands can have different bandwidth. Hence, conversion from one frequency band to another may not result in occupying the full sub-band bandwidth.

Figure 19:
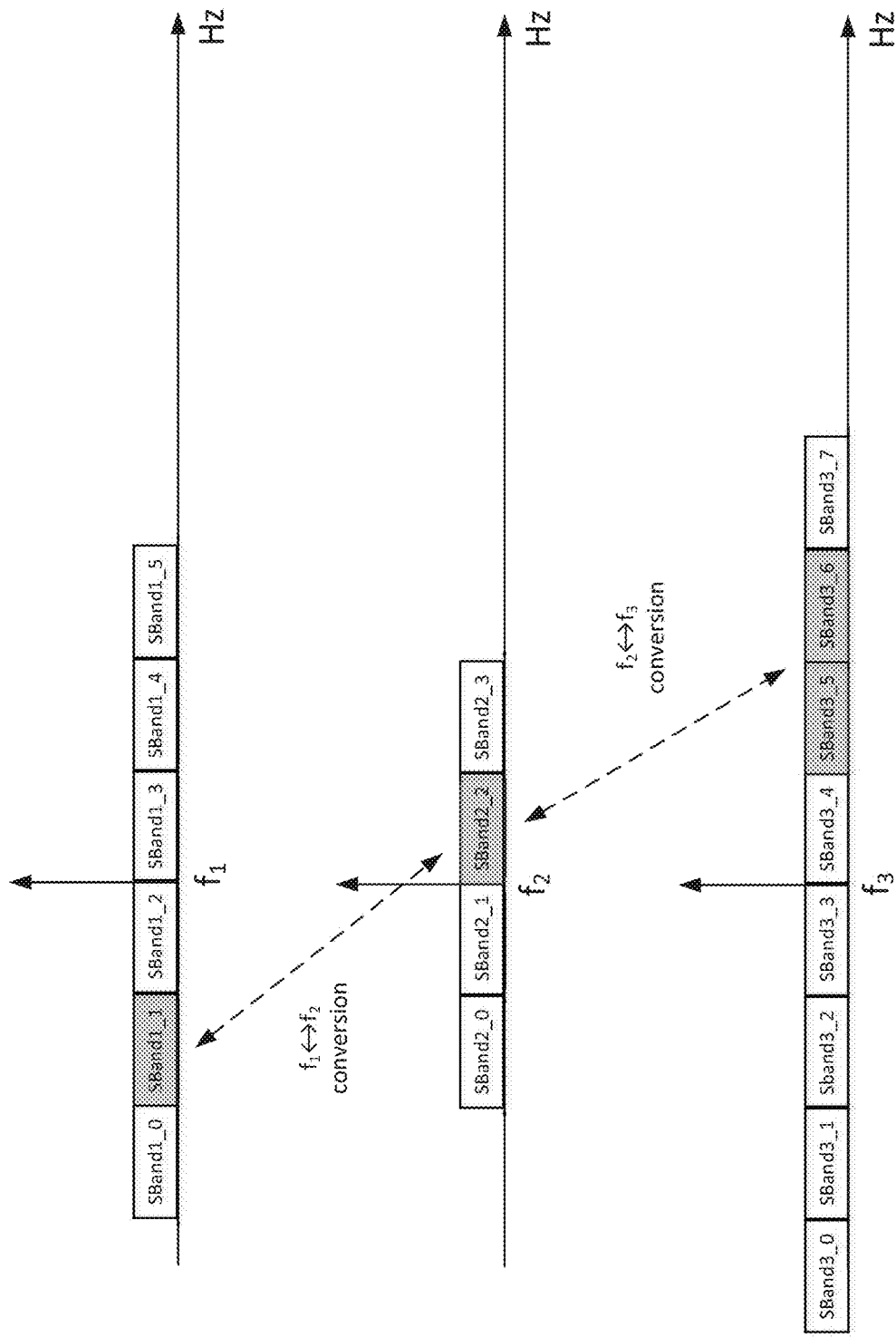

According to other disclosed embodiments, the outside and the inside modules 208 and 216 may include band selection mechanisms that select the $f_1$, $f_2$, and $f_3$ frequency sub-bands where the frequency band conversion requires more than one sub-band in some of the frequency bands as shown in FIG. 19. The conversion from $f_2$ to $f_3$ requires occupying more than one sub-band in $f_3$ band.

Those skilled in the art will recognize that, for simplicity and clarity, the full structure and operation of all systems suitable for use with the present disclosure is not being depicted or described herein. Instead, only so much of a system as is unique to the present disclosure or necessary for an understanding of the present disclosure is depicted and described. The remainder of the construction and operation of the disclosed systems may conform to any of the various current implementations and practices known in the art.

Of course, those of skill in the art will recognize that, unless specifically indicated or required by the sequence of operations, certain steps in the processes described above may be omitted, performed concurrently or sequentially, or performed in a different order. Further, no component, element, or process should be considered essential to any specific claimed embodiment, and each of the components, elements, or processes can be combined in still other embodiments.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

The invention claimed is:

1. A wireless communications system comprising:
   an outside module configured to receive downlink signals in a millimeter wave frequency band, the outside module including a wireless power receiver;
   an inside module separated from the outside module by a separation medium and configured to wirelessly communicate with the outside module and to communicate with a communications device, the inside module including a wireless power transmitter configured to wirelessly transmit power to the outside module, wherein the outside module is powered by wireless power transfer, and wherein the inside module communicates with the communications device at a second frequency band, and wherein the millimeter wave frequency band is separated from the second frequency band by at least 10 GHz.

2. The system of claim 1, wherein the outside module receives the downlink signals from a radio base station.

3. The system of claim 1, wherein the inside module communicates with the outside module at a third frequency.

4. The system of claim 1, wherein the inside module receives power via power over ethernet (PoE).

5. The system of claim 1, wherein the inside and outside modules include respective wireless power transmit coils that are aligned for wireless power transfer.

6. The system of claim 1, wherein the second and third frequencies are sub 6 GHz bands.

7. The system of claim 1, wherein the second and third frequencies are same.

8. The system of claim 1, wherein the separation medium is a wall.

9. The system of claim 1, wherein the separation medium is glass.

10. The system of claim 1, wherein the inside module is installed inside a vehicle and the outside module is installed on the outside surface of the vehicle.

11. The system of claim 1, wherein the inside module communicates with the outside module using optical wireless communications.

12. A wireless communications system comprising:
   an outside module configured to transmit uplink signals at a first frequency band and to receive downlink signals at a millimeter wave frequency band, the outside module including a wireless power receiver;
   an inside module separated from the outside module by a separation medium and configured to communicate wirelessly with the outside module at a third frequency and to communicate with a communications device at a fourth frequency, the inside module including a wireless power transmitter configured to wirelessly transmit power to the outside module, wherein the outside module is powered by wireless power transfer, wherein the millimeter wave frequency band is separated from the fourth frequency band by at least 10 GHz.

13. The system of claim 12, wherein the first frequency is millimeter wave frequency band.

14. The system of claim 12, wherein the third and fourth frequencies are sub 6 GHz bands.

15. The system of claim 12, wherein the third and fourth frequencies are same.

16. The system of claim 12, wherein the outside module comprises first and second antenna array configured to operate at millimeter wave frequency bands and sub-6 GHz bands, respectively.

17. The system of claim 12, wherein the separation medium is a wall.

18. The system of claim 12, wherein the separation medium is glass.

19. The system of claim 12, wherein the inside module is installed inside a vehicle and the outside module is installed on the outside surface of the vehicle.

* * * * *